Oct. 26, 1954 — D. S. EASTWOOD — 2,692,733
COFFEE MILL
Filed Nov. 14, 1950 — 2 Sheets-Sheet 1

INVENTOR.
DAVID S. EASTWOOD.
BY Walter J. Stevenson
Agent.

Oct. 26, 1954

D. S. EASTWOOD 2,692,733

COFFEE MILL

Filed Nov. 14, 1950

INVENTOR.
DAVID S. EASTWOOD.
BY
Walter J. Stevenson
Agent.

Patented Oct. 26, 1954

2,692,733

UNITED STATES PATENT OFFICE 2,692,733

COFFEE MILL

David S. Eastwood, Los Angeles, Calif.

Application November 14, 1950, Serial No. 195,586

1 Claim. (Cl. 241—256)

This invention relates generally to mills for reducing the size of various materials, and more particularly to a mill of commercial size for grinding coffee.

Mills commonly employed for grinding coffee usually include a pair of relatively rotatable, axially aligned, cutter discs, plates, or rings, between the adjacent faces of which the roasted coffee beans are fed to be cracked and reduced to small granules, the cutter discs being enclosed in a housing or hood. The discs or rings have teeth or cracking lugs on their adjacent faces which act to break and reduce the coffee beans and granules thereof. It is well known that in order to effect greatest efficiency, and to adjust the mill for grinding various sizes, the space between the adjacent faces must be adjusted with precision. To effect such adjustment, one or both cutter discs are moved axially toward and away from each other and, since the discs are enclosed in the housing, the latter must be first removed to provide access to the discs, and this is a disadvantage of prior coffee mills. Another deficiency of such machines resides in the fact that while the discs can be relatively adjusted in an axial direction, they are not adjustable in other directions so that no provision is made for coaxially aligning the discs or for relatively moving the discs to maintain their cutting faces parallel.

It is therefore an important object of this invention to provide a coffee mill which employs a pair of co-operating coaxial cutter rings having machined cutter faces and teeth between which the coffee beans are fed to be granulated by the cracking teeth on said faces, said mill embodying means disposed exteriorly of the housing enclosing the rings by which one cutter or grinding ring can be adjusted relative to the other ring in an axial direction to vary the spacing between the grinding faces of the rings, and in directions substantially normal to the centers of the rings to effect a true parallel relation between the co-operating grinding faces of the rings.

Another object is to provide a coffee mill in which one of said granulating rings is fixedly secured to a frame and the other ring is carried by and rotatable with a shaft which extends through the stationary ring, the major portion of the shaft being disposed exteriorly of the housing enclosing the rings and being adjustable in an axial direction, in a vertical direction, and in a horizontal direction so that the ring carried thereby can be readily adjusted in all directions to achieve perfect alignment and cooperation between the grinding teeth of the rings.

A further object is to provide a machine, of the character referred to, having spring means for normally moving the shaft in a direction to space the rotary cutter ring away from the stationary cutter ring, and a simple adjusting means operative to move the shaft in the opposite direction so as to adjust the rotary ring toward the stationary ring, said means including a spring for absorbing shock and permitting the cutters to open in the event that a metal or other foreign object moves in between the rings.

A further object is to provide means by which one of the bearings for the shaft can be tilted so as to raise and lower the end of the shaft carrying the rotary cutter ring.

Further objects of the invention will appear from the following description and from the drawings, which are intended for the purpose of illustration only, and in which.

Figure 1:
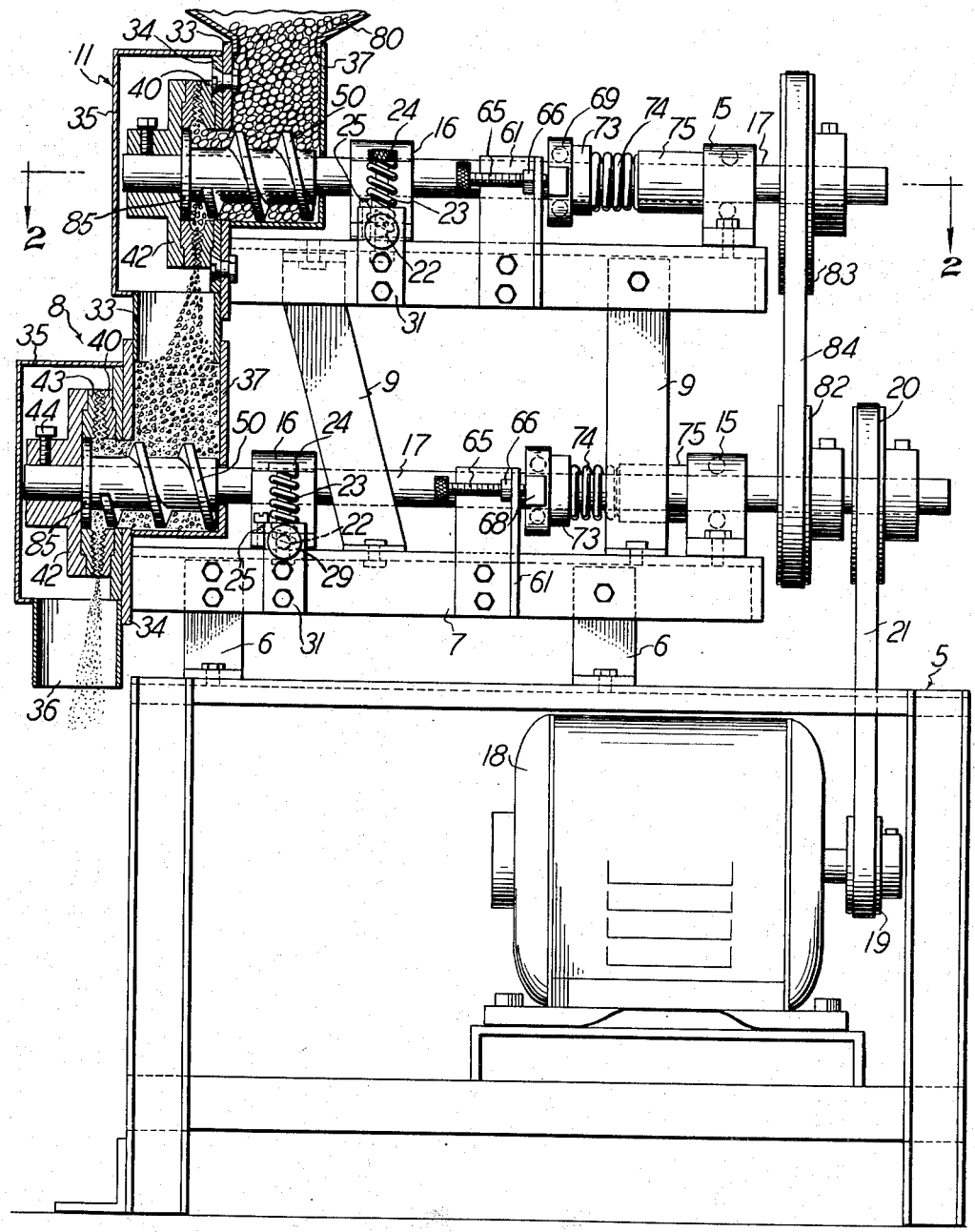
Fig. 1 is a side view of my improved coffee mill, the cutting or granulating units being shown in section.

Referring to the drawings in detail, the improved coffee mill or granulating machine includes a rectangular, table-like base 5, preferably constructed from structural steel sections. Supported by feet 6 is a bed or frame 7 which provides a support for a lower coffee grinding or granulating unit 8, to be presently described. The frame 7 carries uprights 9 and secured to the upper ends of these parts is a second bed or frame 7 which forms a support for an upper coffee grinding or granulating unit 11.

Rotatable in bearings 15 and 16 on the lower frame 7 is a shaft 17 which is driven from an electric motor 18 through the medium of a pulley 19 on the motor shaft, a pulley 20 on the shaft 17, and a driving belt 21. The bearing 15 is fixed on the frame 7 while the bearing 16 is slidable vertically on studs 22. Coil springs 23 surrounding the studs 22 and compressed between heads 24 at the upper ends of the studs and horizontal portions of the bearings 16 act to normally force the bearing downwardly. However, a set-screw 25 threaded through one side of the bearing 16 and against the upper surface of the frame 7 is utilized as a means for tilting one side of the bearing 16 so as to, in effect, raise and lower the left-hand end of the shaft 17.

Referring to Fig. 1, it will be observed that the bearing 16 is also adjustable in a horizontal direction, transversely of the axis of the shaft 17. The means for effecting this latter adjustment comprises a pair of thumb-screws 29 and 30 screwed through threaded holes in brackets 31 carried by the frame 7 with their threaded ends engaging the sides of the bearing 16. By loosening either thumb-screw 29 or 30 and tightening the other thumb-screw the bearing 16 may be shifted transversely.

Mounted on the frame 7 at the forward end thereof is a plate 33, to the forward face of which is secured an annular holder 34. Detachably connected to the holder 34 and extending forwardly therefrom is a housing or cover 35, the lower end of which provides a discharge spout 36. Secured to the rearward side of the plate 33 is a supply duct 37 having an open upper end.

Figure 4:
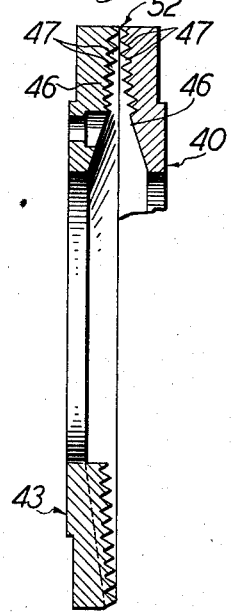
Fig. 4 is a cross-sectional view, taken on line 4—4 of Fig. 3.
Figure 3:
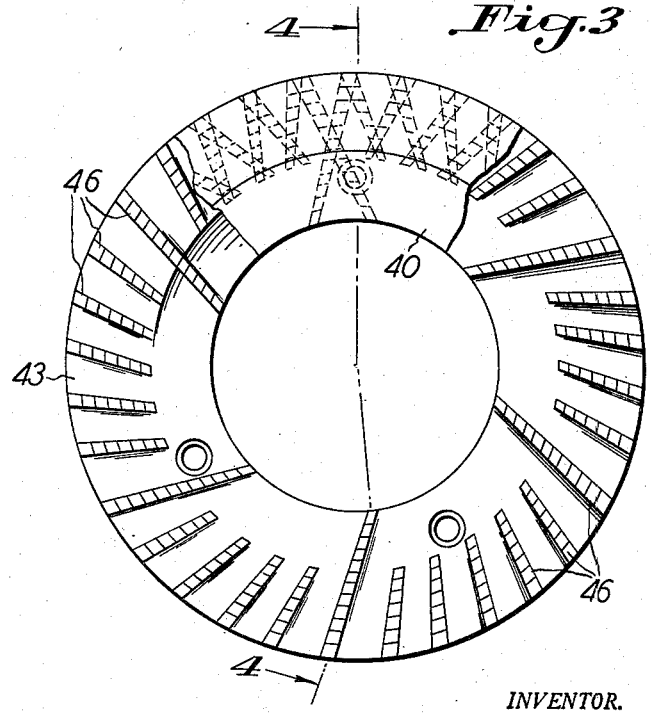
Fig. 3 is a face view of the cutter rings, one ring being partly broken away.

Attached to the forward face of the holder 34 is an inner, stationary cutter disc or granulating ring 40, to be presently described in detail. Carried by the shaft 17 at its forward projecting end is a plate-like hub 42, to which is secured an outer cutter disc or granulating ring 43, the hub being attached to the shaft by a set-screw 44. The granulating rings are similar, each being provided with a plurality of substantially radially-extending ribs 46 on one face. Each ring has a series of concentric grooves 47 of V-shaped cross-sectional shape machined into the face of the ribs 46. As shown in Fig. 3, the ribs of the companion granulating rings slant in opposite directions so that when the outer ring 43 is rotated with respect to the inner stationary ring the breaker ribs and their teeth act to crack and shear the coffee beans and fragments thereof which are disposed between the rings. The coffee beans or fragments are fed into position between the rings adjacent the axes thereof by means of a feed screw 50 carried by the shaft 17 within the supply duct 37. When the shaft 17 is rotated, the screw 50 acts to feed the coffee from the duct 37 into the space between the granulating rings 40 and 43 and radially outwardly therebetween. During such radially outward movement of the coffee, the grooved ribs 46 crush the same and reduce it to progressively smaller fragments. In this respect it is to be noted by reference to Fig. 4 that the ribs 46 of the adjacent rings converge in a radially outward direction so as to reduce the coffee to progressively smaller granules. Eventually, the ground coffee discharges from the peripheral portions of the granulating rings and into the discharge duct 36 through which it flows into a bin or into sacks disposed therebeneath.

After initially assembling the granulating or grinding rings 40 and 43 in place of following reinstallation thereof subsequent to the regrinding of their cooperating surfaces, it is extremely important that the rings be axially aligned with precision so as to effect proper co-operation between their grooved ribs 46 and the teeth thereof. This is necessary to cause the pointed teeth between the grooves 47 at the peripheral portion of each ring to fit within the grooves at the corresponding portion of the other ring as indicated at 52 in Fig. 4. To effect such accurate adjustment of the outer ring 43 with respect to the inner ring 40, the shaft 17, which carries the ring 43, may be adjusted in several directions. When the rings 40 and 43 are out of alignment, manual rotation of the shaft 17 will cause the outer grooved portions of the rings to engage, thus producing an audible scraping sound. By adjusting the shaft 17 vertically, by means of the set-screw 25, against the action of the spring 23 (Fig. 1), or by shifting the forward end of the shaft transversely by manipulating the thumb-screws 29 and 30, or by adjusting the shaft both vertically and transversely, the outer ring 43 is brought into axial alignment with the fixed ring 40.

It is also essential that the outer ring 43 be adjustable axially to effect proper co-operation between the cutting or grinding faces of the rings. By such adjustment, the spacing between the faces of the rings adjacent their peripheries, as shown at 52 in Fig. 4, may be varied so as to reduce the coffee to granules of desired size. The means for effecting such axial adjustment is constructed and arranged as next described.

Attached to the sides of the frame 7 and projecting above the top of the frame are angular brackets 60 and 61, the bracket 60 carrying a plunger 62 which normally is urged rearwardly under the action of a shock-absorber spring 63, the plunger having a socket 64 in its rearward end. The other bracket 61 carries an adjustable thumb-screw 65 which is retained in selected positions of adjustment by means of a check-nut 66.

A cross-arm 68 is mounted on the shaft 17 by means of a ball-bearing 69. The arm 68 carries a thumb-screw 70 at one end engageable in the socket 64 of the plunger 62, the screw 70 being adjustable on the arm and retained in selected positions by means of a check-nut 71. The other end of the cross-arm 68 rests against the end of the adjusting screw 65.

Fixed to the shaft 17 is a collar 73 against which the cross-arm 68 engages. A compression spring 74 surrounding the shaft between a sleeve 75 and the collar 73 normally acts to force the shaft 17 forwardly against the influence of the plunger spring 63. By tightening or loosening either the screw 65 or 70, or both, the shaft 17 is shifted axially to accurately space the outer granulating ring 43 from the stationary ring 40 so as to grind the coffee to the desired size.

It is to be noted that adjustment of the grinder rings is effected by simply adjusting the shaft 17 and this is an advantage over similar machines in which it is necessary to remove the housing surrounding the rings and thereafter adjust the stationary ring with respect to the rotary ring.

It will be observed that the present machine is so constructed that it performs a double grinding or milling of the coffee. That is to say, the machine is composed of the two granulating units 8 and 11 through which the coffee passes to be ground. The unit 11 is identical to the unit 8 which has been described in detail, and the same reference numerals indicate like elements. The coffee supply duct 37 of the upper unit 11 is connected to the lower end or spout of a hopper 80 for containing a supply of roasted coffee beans. During operation of the machine, the coffee beans are fed in between the granulating rings 40 and 43 of the unit 11 by means of the upper feed screw 50. After being milled between the upper rings, the coffee granules discharge into the duct 37 of the lower unit 8, from which point they are fed in between the rings 40 and 43 of the lower unit to be further reduced in size, after which the granules are discharged through the delivery chute 36.

In order to effect proper co-operation between the units 8 and 11, that is, to adapt the lower unit to handle a greater volume of the coffee, the upper unit 11 is driven at a slower speed than the lower unit 8. This speed ratio is achieved by rotating the upper shaft 17 from the lower shaft 17 by means of a pulley 82 on the lower shaft which drives a larger pulley 83 on the upper shaft through the medium of a belt 84.

Figure 2:
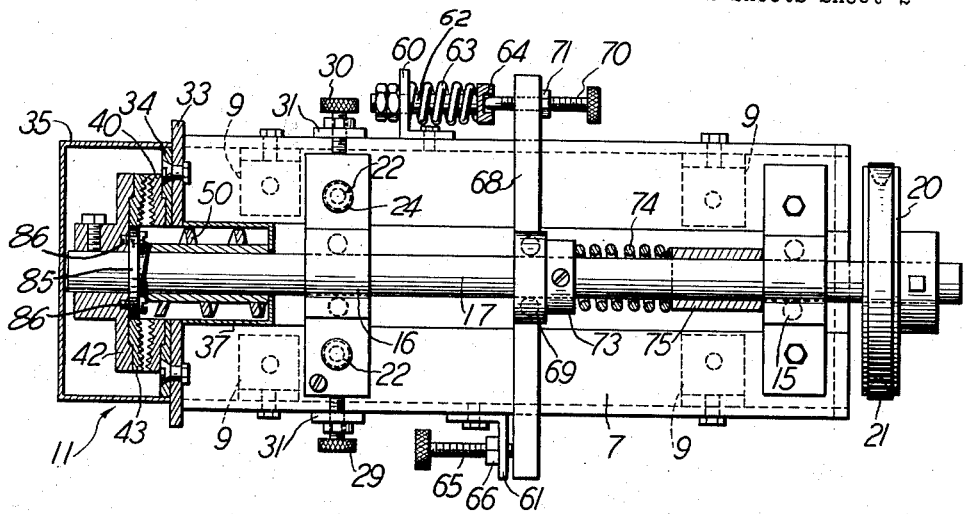
Fig. 2 is a plan view of the same.

It will be observed that each screw 50 has a flange 85 which is secured to the inner face of the hub 42 by screws 86 (Fig. 2). By this construction, it is unnecessary to secure the screw 50 directly to the shaft 17, since the hub is itself so secured. When it is desired to replace the cutter rings 40, 43, the set-screw 44 is loosened to allow the hub together with its cutter ring 43 and feed screw 50 to be slid from the forward end of the shaft 17, after which the ring 43 can be removed from the hub and the ring 40 can be detached from the holder 34.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by modified means.

I claim as my invention:

A coffee mill, comprising: a frame, a first non-rotatable grinding ring fixed on said frame, said ring having a grinding face provided with alternate, concentric, precision machined, circular teeth and grooves; at least one bearing on said frame at one side of said ring and in substantially axial alignment therewith; a shaft rotatable in said bearing and having an end extending substantially coaxially of and projecting through said first ring; a second grinding ring carried by said projecting end of said shaft and rotatable therewith, said second ring being disposed at the opposite side of said first ring and having a grinding face disposed closely adjacent said face of said first ring and provided with alternate, concentric, precision machined, circular teeth and grooves, certain of the teeth of each ring being disposed in the grooves of the other ring; adjusting means for adjusting said shaft axially and radially in said bearing so as to effect cooperation between the grinding teeth and grooves of said grinding rings, said adjusting means including a collar on said shaft, spring means engaging one side of said collar and normally urging said shaft in a first direction to move said second ring axially away from said first ring, and movable means engaging the other side of said collar for moving said shaft in the opposite direction against the action of said spring means so as to move said second ring toward said first ring.

References Cited in the file of this patent
UNITED STATES PATENTS

| Number | Name | Date |
|---|---|---|
| 615,507 | Sovereign | Dec. 6, 1898 |
| 826,711 | Davis | July 24, 1906 |
| 935,985 | Hobart et al. | Oct. 5, 1909 |
| 989,217 | Wear | Apr. 11, 1911 |
| 1,049,395 | Pritchard | Jan. 7, 1913 |
| 1,130,233 | Wood | Mar. 2, 1915 |
| 1,206,316 | Ellis | Nov. 28, 1916 |
| 1,412,026 | Sturtevant | Apr. 4, 1922 |
| 1,488,166 | Pottratz | Mar. 25, 1924 |

FOREIGN PATENTS

| Number | Country | Date |
|---|---|---|
| 572,465 | France | June 6, 1924 |